United States Patent
Standiford

(10) Patent No.: US 11,499,857 B2
(45) Date of Patent: Nov. 15, 2022

(54) CORRECTING A MEASURED FLOW RATE FOR VISCOSITY EFFECTS

(71) Applicant: Micro Motion, Inc., Boulder, CO (US)

(72) Inventor: Dean M. Standiford, Loveland, CO (US)

(73) Assignee: Micro Motion, Inc., Boulder, CO (US)

( * ) Notice: Subject to any disclaimer, the term of this patent is extended or adjusted under 35 U.S.C. 154(b) by 271 days.

(21) Appl. No.: 16/610,167

(22) PCT Filed: May 11, 2017

(86) PCT No.: PCT/US2017/032105
§ 371 (c)(1),
(2) Date: Nov. 1, 2019

(87) PCT Pub. No.: WO2018/208301
PCT Pub. Date: Nov. 15, 2018

(65) Prior Publication Data
US 2020/0249062 A1    Aug. 6, 2020

(51) Int. Cl.
*G01F 1/84* (2006.01)
*G01N 11/16* (2006.01)

(52) U.S. Cl.
CPC .......... *G01F 1/8436* (2013.01); *G01F 1/8427* (2013.01); *G01F 1/8477* (2013.01); *G01N 11/16* (2013.01)

(58) Field of Classification Search
CPC .... G01F 1/8436; G01F 1/8427; G01F 1/8477; G01N 11/16

USPC ........................................................ 73/54.02
See application file for complete search history.

(56) References Cited

U.S. PATENT DOCUMENTS

| | | | |
|---|---|---|---|
| 5,661,232 A | 8/1997 | Van Cleve et al. | |
| 6,513,393 B1 | 2/2003 | Eckert et al. | |
| 6,651,513 B2 | 11/2003 | Wenger et al. | |
| 2001/0039829 A1* | 11/2001 | Wenger | G01F 1/8418 73/54.41 |
| 2005/0241372 A1* | 11/2005 | Drahm | G01F 1/8413 73/54.24 |
| 2007/0084298 A1 | 4/2007 | Rieder et al. | |
| 2010/0281998 A1* | 11/2010 | Braun | G01F 1/8477 73/861.357 |
| 2012/0232811 A1* | 9/2012 | Pankratz | G01F 25/0007 702/47 |
| 2014/0076408 A1 | 3/2014 | Zimmer et al. | |

FOREIGN PATENT DOCUMENTS

WO    2014051582 A1    4/2014

* cited by examiner

*Primary Examiner* — Nathaniel T Woodward
(74) *Attorney, Agent, or Firm* — The Ollila Law Group LLC

(57) ABSTRACT

A system (600, 700) for correcting a measured flow rate for viscosity effects of a fluid in a vibratory meter (5) is provided. The system (600, 700) includes a sensor assembly (10) and a meter electronics (20) communicatively coupled to the sensor assembly (10). The meter electronics (20) is configured to receive sensor signals from the sensor assembly (10), determine a non-viscosity correlation parameter based on the sensor signals, and correlate the non-viscosity correlation parameter to a viscosity of a fluid in the sensor assembly (10).

16 Claims, 8 Drawing Sheets

CORRECTING A MEASURED FLOW RATE FOR VISCOSITY EFFECTS

TECHNICAL FIELD

The embodiments described below relate to vibratory sensors and, more particularly, to correcting a measured flow rate for viscosity effects.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

The amount of Coriolis force is directly proportional to the mass flow rate of the fluid flowing through the tube. The resonant frequency of vibration of the Coriolis mass flowmeter is influenced by the stiffness of the tube. Most corrections to Coriolis mass flowmeters are based on how the tube's stiffness changes with process and/or environmental conditions. (e.g., pressure and temperature). When the fluid flowing through the tube stops acting as a single mass (i.e., fluid at the center of the flow stream is not flowing at the same rate as the fluid next to the tube wall), additional secondary effects may be observed. This is referred to as a viscosity effect. Reynolds number is used to define the flow profile in a pipeline where this effect is most prevalent and the viscosity of the fluid is used to calculate Reynolds number. Accordingly, there is a need to correct for viscosity effects. The challenge is to develop a correction method that does not use viscosity, or number based on a viscosity measurement, such as the Reynolds number, or equipment in addition to the Coriolis mass flow meter.

SUMMARY

A system for correcting a measured flow rate for viscosity effects of a fluid in a vibratory meter is provided. According to an embodiment, the system comprises a sensor assembly and a meter electronics communicatively coupled to the sensor assembly. The meter electronics is configured to receive sensor signals from the sensor assembly, determine a non-viscosity correlation parameter based on the sensor signals, and correlate the non-viscosity correlation parameter to a viscosity of a fluid in the sensor assembly.

A method for correcting a measured flow rate for viscosity effects of a fluid in a vibratory meter is provided. According to an embodiment, the method comprises receiving sensor signals from a sensor assembly, determining a non-viscosity correlation parameter based on the sensor signals, and correlating the non-viscosity correlation parameter to a viscosity of a fluid in the sensor assembly.

A vibratory meter for correcting a measured flow rate for viscosity effects of a fluid is provided. According to an embodiment, the vibratory meter comprises a sensor assembly and a meter electronics communicatively coupled to the sensor assembly. The meter electronics is configured to determine a fluid flow rate and a non-viscosity correlation parameter of the fluid based on sensor signals from a sensor assembly of a vibratory meter and correct the fluid flow rate based on the non-viscosity correlation parameter, said non-viscosity correlation parameter being correlated with a viscosity value.

A method of correcting a measured flow rate for viscosity effects of a fluid in a vibratory meter is provided. According to an embodiment, the method comprises determining a fluid flow rate and a non-viscosity correlation parameter of the fluid based on sensor signals from a sensor assembly of a vibratory meter and correcting the fluid flow rate based on the non-viscosity correlation parameter, said non-viscosity correlation parameter being correlated with a viscosity value.

Aspects

According to an aspect, a system (600, 700) for correcting a measured flow rate for viscosity effects of a fluid in a vibratory meter (5) comprises a sensor assembly (10) and a meter electronics (20) communicatively coupled to the sensor assembly (10). The meter electronics (20) is configured to receive sensor signals from the sensor assembly (10), determine a non-viscosity correlation parameter based on the sensor signals, and correlate the non-viscosity correlation parameter to a viscosity of a fluid in the sensor assembly (10).

Preferably, the meter electronics (20) is further configured to correlate the non-viscosity correlation parameter with a viscosity of two or more fluids.

Preferably, the meter electronics (20) is further configured to correlate the non-viscosity correlation parameter to an error percentage of a fluid flow rate of the fluid in the sensor assembly (10).

Preferably, the non-viscosity correlation parameter comprises one of a fluid velocity-to-mass flow rate ratio and a vibrating frequency ratio of the vibratory meter (5).

Preferably, the system (600, 700) further comprising a viscometer (610, 710) communicatively coupled to the meter electronics (20), said viscometer (610, 710) being configured to measure the viscosity of the fluid and provide the measured viscosity to the meter electronics (20).

Preferably, the meter electronics (20) is further configured to determine a fluid flow rate based on the sensor signals.

According to an aspect, a method for correcting a measured flow rate for viscosity effects of a fluid in a vibratory meter comprises receiving sensor signals from a sensor assembly, determining a non-viscosity correlation parameter based on the sensor signals, and correlating the non-viscosity correlation parameter to a viscosity of a fluid in the sensor assembly.

Preferably, the method further comprises correlating the non-viscosity correlation parameter to a viscosity of two or more fluids.

Preferably, the method further comprises correlating the non-viscosity correlation parameter to an error percentage of the measured flow rate and correlating the error percentage to a viscosity of the fluid in the sensor assembly.

Preferably, the non-viscosity correlation parameter comprises one of a fluid velocity-to-mass flow rate ratio and a vibrating frequency ratio of the vibratory meter.

According to an aspect, a vibratory meter (5) for correcting a measured flow rate for viscosity effects of a fluid comprises a sensor assembly (10) and a meter electronics (20) communicatively coupled to the sensor assembly (10). The meter electronics (20) is configured to determine a fluid flow rate and a non-viscosity correlation parameter of the fluid based on sensor signals from a sensor assembly of a vibratory meter and correct the fluid flow rate based on the non-viscosity correlation parameter, said non-viscosity correlation parameter being correlated with a viscosity value.

Preferably, the non-viscosity correlation parameter is correlated with a viscosity value of two or more fluids.

Preferably, the non-viscosity correlation parameter being correlated with the viscosity value comprises the non-viscosity correlation parameter being correlated with a viscosity value of one or more other fluids.

Preferably, the meter electronics (20) being configured to correct the fluid flow rate based on the non-viscosity correlation parameter comprises the meter electronics (20) being configured to obtain an error percentage of a flow rate correlated with the non-viscosity correlation parameter and correcting the fluid flow rate using the error percentage.

Preferably, the non-viscosity correlation parameter comprises one of a fluid velocity-to-mass flow rate ratio and a vibrating frequency ratio of the vibratory meter.

According to an aspect, a method of correcting a measured flow rate for viscosity effects of a fluid in a vibratory meter comprises determining a fluid flow rate and a non-viscosity correlation parameter of the fluid based on sensor signals from a sensor assembly of a vibratory meter and correcting the fluid flow rate based on the non-viscosity correlation parameter, said non-viscosity correlation parameter being correlated with a viscosity value.

Preferably, the non-viscosity correlation parameter is correlated with a viscosity value of two or more fluids.

Preferably, the non-viscosity correlation parameter being correlated with the viscosity value comprises the non-viscosity correlation parameter being correlated with a viscosity value of one or more other fluids.

Preferably, wherein correcting the fluid flow rate based on the non-viscosity correlation parameter comprises obtaining an error percentage of a flow rate correlated with the non-viscosity correlation parameter and correcting the fluid flow rate using the error percentage.

Preferably, the non-viscosity correlation parameter comprises one of a fluid velocity-to-mass flow rate ratio and a vibrating frequency ratio of the vibratory meter.

BRIEF DESCRIPTION OF THE DRAWINGS

The same reference number represents the same element on all drawings. It should be understood that the drawings are not necessarily to scale.

DETAILED DESCRIPTION

FIGS. 1-9 and the following description depict specific examples to teach those skilled in the art how to make and use the best mode of embodiments of correcting a measured flow rate for viscosity effects. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of correcting a measured flow rate for viscosity effects. As a result, the embodiments described below are not limited to the specific examples described below, but only by the claims and their equivalents.

A system and method for correcting a measured flow rate for viscosity effects of a fluid in a vibratory meter includes at least a sensor assembly and a meter electronics in communication with the sensor assembly. The system can also include a viscosity meter that is configured to measure the viscosity during, for example, calibration of a vibratory meter that includes the sensor assembly and the meter electronics. The system or, more particularly, the meter electronics, can determine a non-viscosity correlation parameter based on sensor signals from the sensor assembly. The meter electronics may also correlate the non-viscosity correlation parameter with a viscosity of the fluid, which may be provided by the viscosity meter, entered into the meter electronics, etc.

A method can correct the measured flow rate using the non-viscosity correlation parameter during, for example, operation of the vibratory meter. More specifically, the method can determine a fluid flow rate and a non-viscosity correlation parameter of the fluid based on sensor signals from a sensor assembly. The method can correct the fluid flow rate based on the non-viscosity correlation parameter, the non-viscosity correlation parameter being correlated with a viscosity value. The viscosity value may be based on other fluids or non-measured fluids, such as calibration fluids that were previously correlated with the non-viscosity correlation parameter.

Accordingly, an unknown fluid may be measured by the vibratory meter, wherein the non-viscosity correlation parameter is determined for the unknown fluid, and then the flow rate corrected for viscosity effects, even though the viscosity is not measured and the viscosity value of the measured fluid is not known. This eliminates the need for entry of viscosity values of the unknown fluid to be measured or a viscosity meter that measures the viscosity of the unknown fluid to be measured and yet still correct the flow rate for the viscosity effects.

Figure 1:
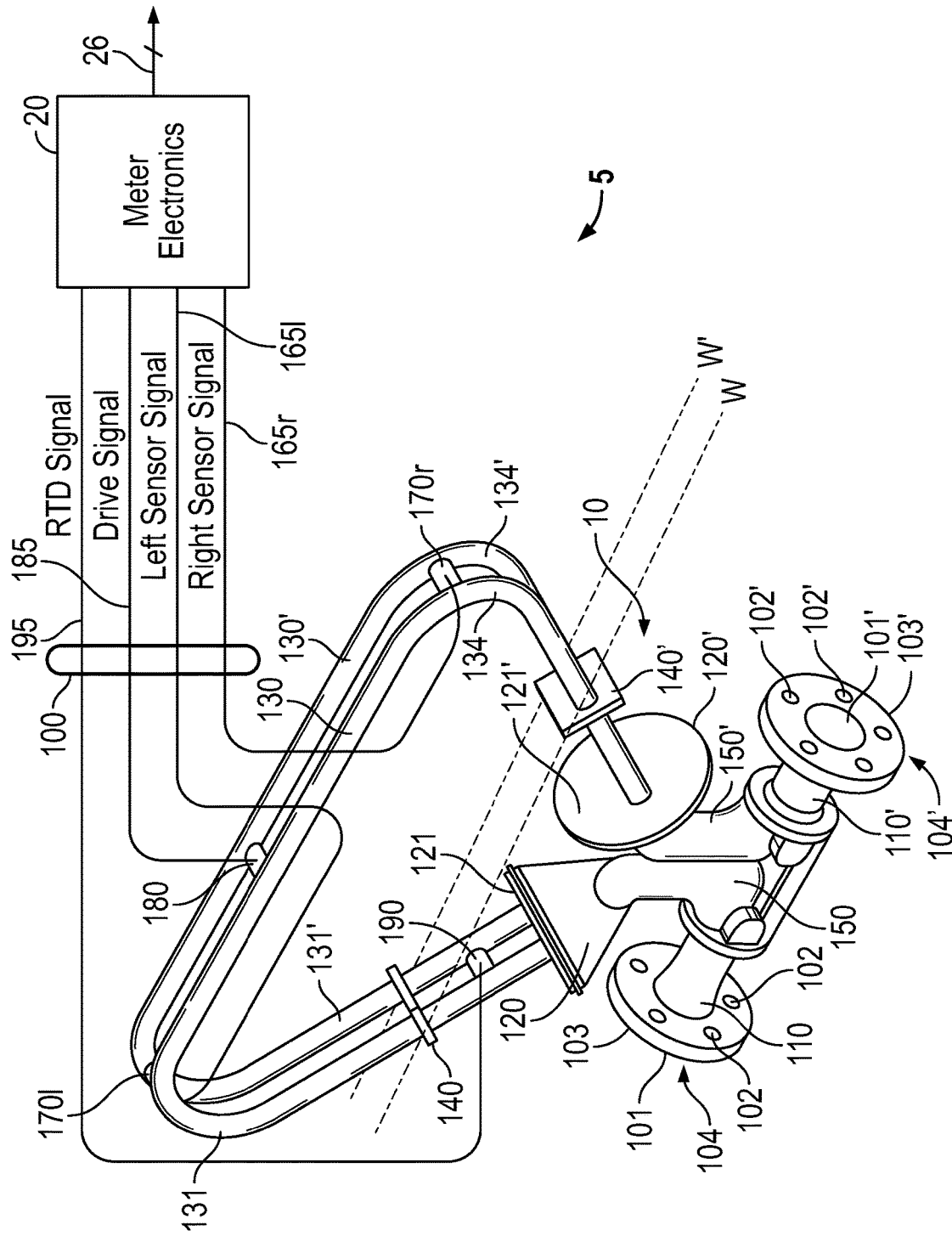
FIG. 1 shows a vibratory meter 5 for correcting a measured flow rate for viscosity effects.

FIG. 1 shows a vibratory meter 5 for correcting a measured flow rate for viscosity effects. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over path 26, as well as other information.

The sensor assembly 10 includes a pair of manifolds 150 and 150', flanges 103 and 103' having flange necks 110 and 110', a pair of parallel conduits 130 and 130', drive mechanism 180, resistive temperature detector (RTD) 190, and a pair of pick-off sensors 170r and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by drive mechanism 180 in opposite directions about their respective bending axes W and W' and at what is termed the first out-of-phase bending mode of the flow meter. This drive mechanism 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the drive mechanism 180.

The meter electronics 20 receives the RTD temperature signal on lead 195, and the left and right sensor signals appearing on leads 100 carrying the left and right sensor signals 165*l*, 165*r*, respectively. The meter electronics 20 produces the drive signal appearing on lead 185 to drive mechanism 180 and vibrate conduits 130, 130'. The meter electronics 20 processes the left and right sensor signals and the RTD signal to compute the mass flow rate and the density of the material passing through sensor assembly 10. This information, along with other information, is applied by meter electronics 20 over path 26 as a signal.

To correct for viscosity secondary effects on the flow rate measurement, correlations between viscosity and non-viscosity correlation parameters are determined for various fluids. The non-viscosity correlation parameter is based on the sensor signals. For example, the left and right sensor signals 165*l*, 165*r* may be used to determine a non-viscosity correlation parameter. In the following, the non-viscosity correlation parameters include a velocity to flow rate ratio and a frequency ratio. In some embodiments, a flow rate correction value is also determined, such as a percentage of a flow rate. This flow rate correction value is also correlated with the viscosity and the non-viscosity correlation parameter. The flow rate correction value can be used to adjust a flow rate of a vibrating flow meter.

Fluid Velocity/Mass Flow Rate Ratio

Figure 2:
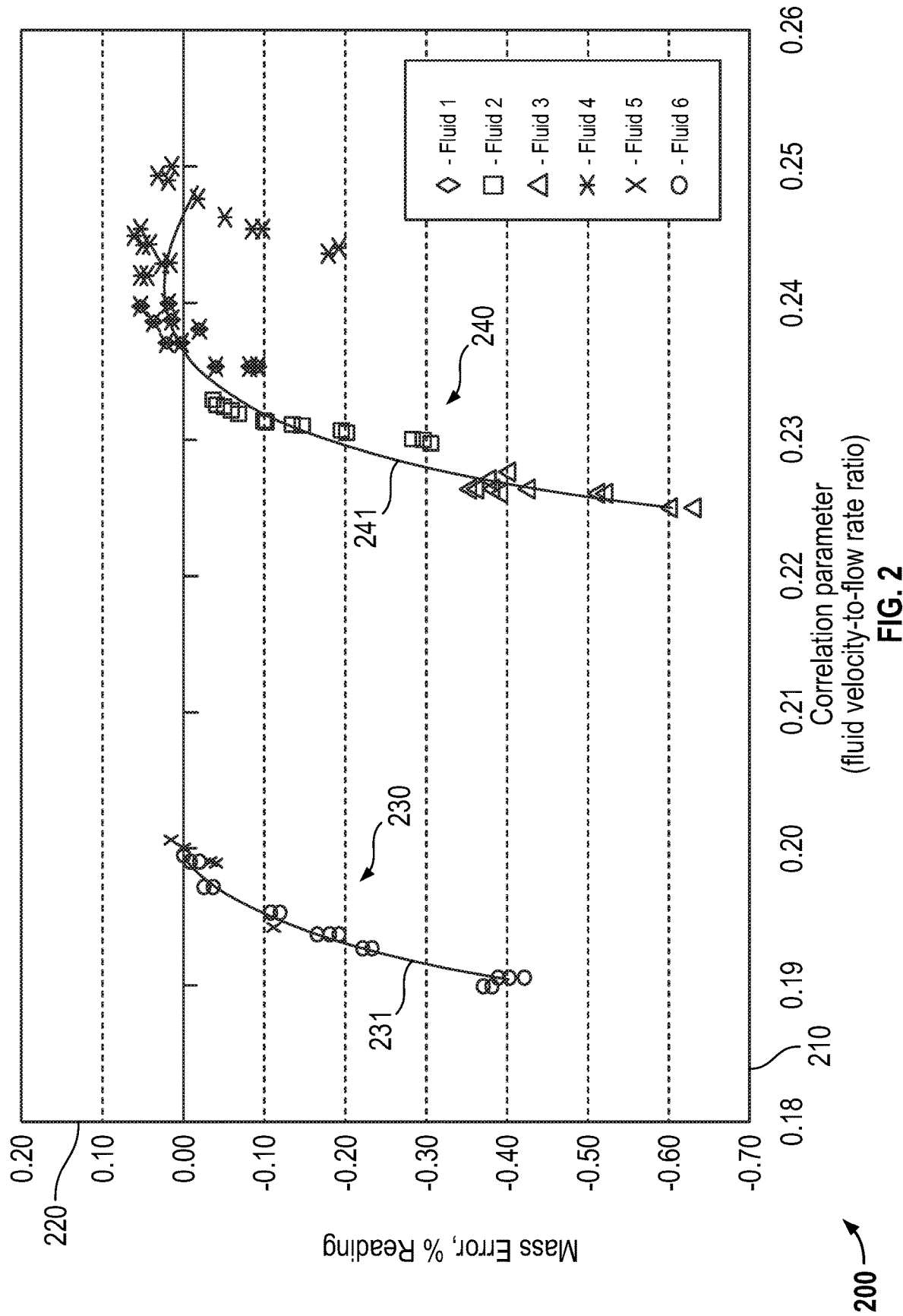
FIG. 2 shows a graph 200 illustrating relationships between mass flow rate errors and correlation parameters used to correct for viscosity effects according to an embodiment.

FIG. 2 shows a graph 200 illustrating relationships between mass flow rate errors and correlation parameters used to correct for viscosity effects according to an embodiment. The graph 200 includes a correlation parameter axis 210 and a mass error axis 220. The correlation parameter axis 210 is a fluid velocity-to-flow rate ratio. The mass error axis 220 is a percentage that can be used to correct a mass flow rate. As shown in FIG. 2, the correlation parameter axis 210 ranges from 0.18 to 0.26. The mass error axis 220 ranges from −0.70 to 0.20. The graph 200 shows a plurality of data points 230, 240 for different fluids. The data points 230, 240 for each of the different fluids are indicated by the differently shaped markers (e.g., triangle, square, cross, double-cross, etc.) and are grouped into a first set of data points 230 and a second set of data points 240.

As shown in the first set of data points 230 is comprised of two fluids, a fifth fluid and sixth fluid, that has correlation parameter values that are distinguishable from the second set of data points 240. More specifically, the first set of data points 230 is comprised of data that includes correlation parameter values that range from about 0.19 to about 0.20 and mass error that ranges from about −0.40 to about 0.00.

A first curve 231 is fit to the first set of data points 230. The first set of data points 230 may be water. More specifically, although the first set of data points 230 is indicated by the legend to be comprised of a fifth fluid and a sixth fluid, both the fifth fluid and the sixth fluid may be water with measurements taken at different times or have different contaminants that do not significantly affect the viscosity of the water. The second set of data points 240 is comprised of four fluids that have similar viscosity properties such that the correlation parameter values range from about 0.225 to about 0.25 and mass error values that range from about −0.65 to about 0.005. A second curve 241 is fit to the second set of data points 240. The second set of data points 240 may be comprised of, for example, oil, gas-oil, a proprietary oil blend, etc.

As can be appreciated, the first and second curve 231, 241 can be used to establish a relationship between a correlation parameter, such as a fluid velocity-to-flow rate ratio and a mass error. The fluid velocity-to-flow rate ratio can be determined, for example, from the sensor signals by calculating a flow rate from the phase difference, calculating the velocity of the fluid using the equivalent cross-sectional area of the conduits 130, 130'. The fluid velocity-to-flow rate ratio may be calculated using these two values and correlated with the viscosity of the fluids, and therefore, can be used to correct a measured flow rate for viscosity effects, as is illustrated in the following.

Figure 3:
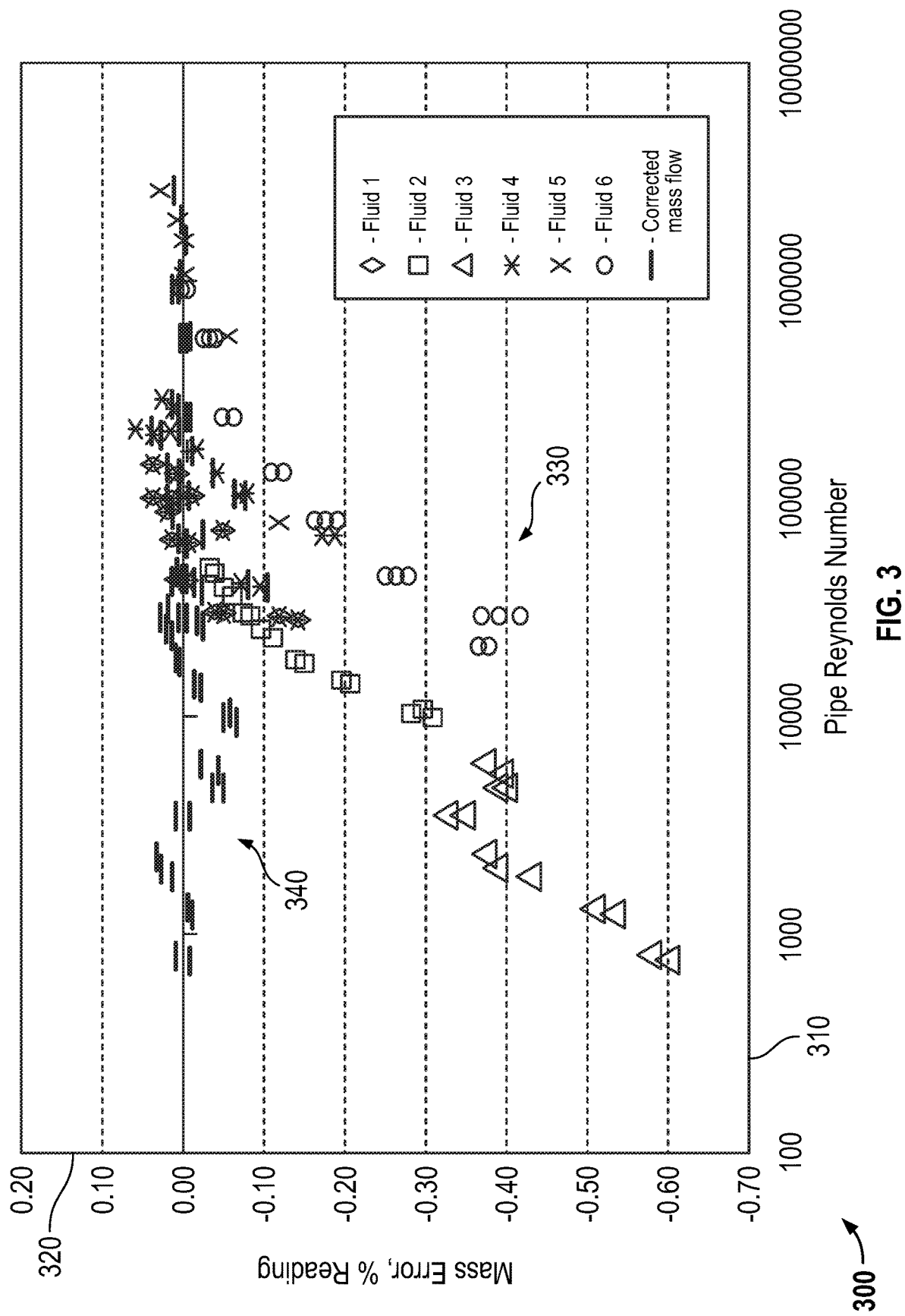
FIG. 3 shows a graph 300 illustrating relationships between mass flow rate errors and pipe Reynolds number used to correct for viscosity effects according to an embodiment.

FIG. 3 shows a graph 300 illustrating relationships between mass flow rate errors and pipe Reynolds number used to correct for viscosity effects according to an embodiment. The graph 300 includes a pipe Reynolds number axis 310 and a mass error axis 320, which is a percentage error of a mass flow rate. The pipe Reynolds number axis 310 is a measure of a viscosity of a fluid. As shown in FIG. 3, the pipe Reynolds number axis 310 ranges from 100 to 10,000,000 on a logarithmic scale and is unit-less, but is related to the viscosity of the fluids. The mass flow percent error axis 320 ranges from −0.70 to 0.20. The graph 300 shows a plurality of uncorrected mass flow rate errors 330 (e.g., an error for an uncorrected mass flow rate reading) for different fluids. The uncorrected mass flow rate errors 330 for the different fluids are indicated by the differently shaped markers, such as triangle, square, cross, double-cross, etc. Also shown in FIG. 3 are corrected mass flow rate errors 340 (e.g., an error for a corrected mass flow rate reading) which are illustrated as dashes. As can be appreciated, the corrected mass flow rate errors 340 have a smaller magnitude than the uncorrected mass flow rate errors 330.

The corrected mass flow rate errors 340 may be obtained by correcting mass flow rate measurements using the non-viscosity correlation parameter discussed with reference to FIG. 2. For example, the meter electronics 20 could determine the fluid velocity-to-flow rate ratio based on the left and right sensor signals 165*l*, 165*r* and the equivalent cross-sectional area of the conduits 130, 130'. The viscosity of the fluid may be previously correlated with the non-viscosity correlation parameter and stored in the meter electronics 20. The meter electronics 20 can then determine the Reynolds number from the non-viscosity correlation parameter. The meter electronics 20 can also have mass error values correlated with Reynold number values. A mass error in percentage can be determined from the Reynolds number. The measured flow rate can then be corrected using the mass error percentage value to result in the corrected mass flow rate errors 340 shown in FIG. 3.

As can be appreciated, non-viscosity correlation parameters other than the fluid velocity-to-flow rate ratio can be employed to correct a measured flow rate. In addition, there are alternative methods and means of correlating the non-viscosity correlation parameters to the viscosity and a flow rate correction value. An example is discussed in the following with reference to FIG. 4.

Vibrating Frequency Ratio

Figure 4:
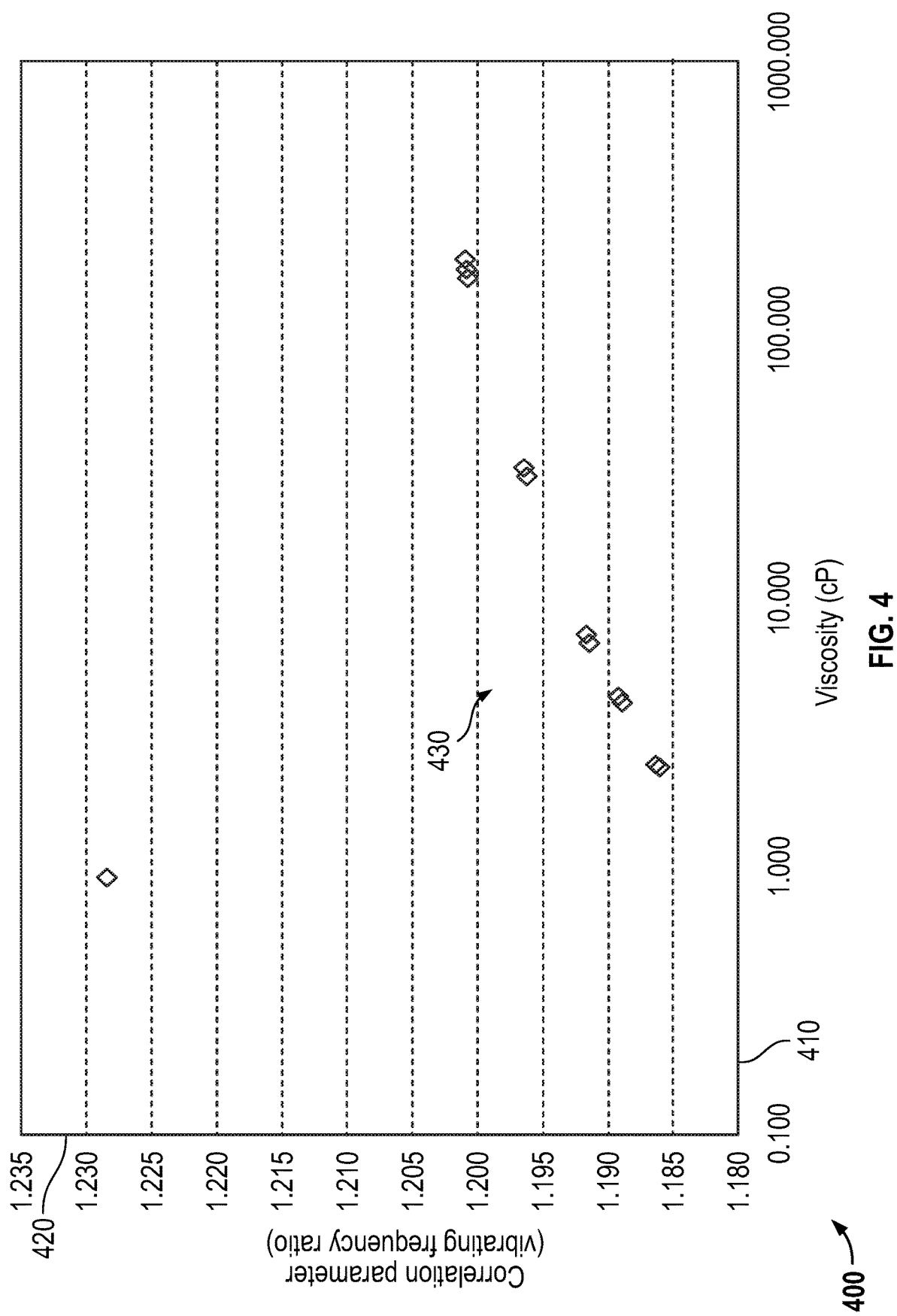
FIG. 4 shows a graph 400 illustrating relationships between mass flow rate errors and viscosity used to correct for viscosity effects according to an embodiment.

FIG. 4 shows a graph 400 illustrating relationships between mass flow rate errors and viscosity used to correct for viscosity effects according to an embodiment. The graph 400 includes a viscosity axis 410 and a correlation parameter axis 420. As shown in FIG. 4, the viscosity axis 410 ranges from 0.100 to 1000.000 centipose (cP). The correlation parameter axis 420 is a vibrating frequency ratio and ranges from −0.70 to 0.20. The vibrating frequency ratio may be an air-to-fluid frequency ratio. That is, a resonance frequency of the conduit filled with a fluid relative to a resonance frequency of the conduit filled with air. The graph 400 shows a plurality of data points 430 for different fluids.

The viscosities of the different fluids are correlated with the non-viscosity correlation parameter, which is, in the example shown in FIG. 4, the vibrating frequency ratio. The vibrating frequency ratio may be determined by, for example, using the vibratory meter 5 described in the foregoing with reference to FIG. 1. In particular, the conduits 130, 130' may be filled with air and vibrated at a resonance frequency. This resonance frequency may be stored in the meter electronics 20 as an air resonance frequency. The conduits 130, 130' may also be filled with a fluid having a viscosity that is different than air and then vibrated to a resonance frequency. This frequency may also be stored as a fluid resonance frequency. The viscosity of the fluid can be stored and correlated with the corresponding vibrating frequency ratio in the meter electronics 20. Other fluids may also be used to determine other vibrating frequency ratios and viscosity values, which may also be stored in the meter electronics 20. As will be described in more detail in the following with reference to FIGS. 6 and 7, the viscosities may also be measured using a system or, alternatively, the viscosities may simply be programmed into the meter electronics 20 as a predetermined value that is associated with a corresponding vibrating frequency ratio.

Still referring to FIG. 4, the graph 400 illustrates correlations between the measured viscosity of each of the fluids and the vibrating frequency ratios. As is shown, the vibrating frequency ratios range from about 1.186 to about 1.228. The vibrating frequency ratio of about 1.228 is correlated with a viscosity of about 1.000. As the viscosity increases from slightly over 1.000, the ratio of conduit frequencies increases from 1.186 to about 1.201. The increase has a parabolic appearance which indicates that the values can be fitted to a curve, thereby allowing the use of an equation to correlate a continuous range of vibrating frequency ratios to viscosity.

Figure 5:
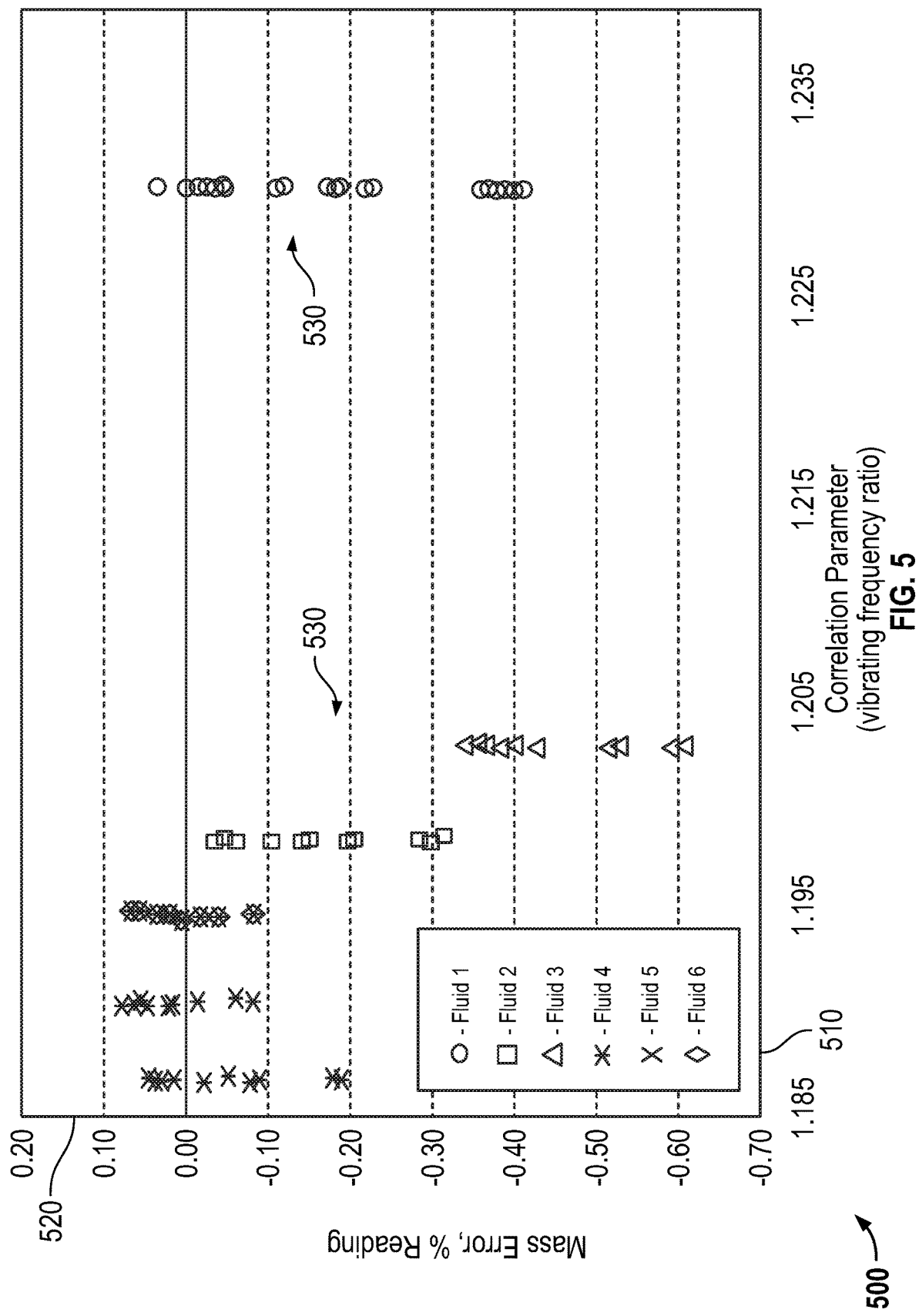
FIG. 5 shows a graph 500 illustrating relationships between correlation parameters and flow rate correction values used to correct for viscosity effects according to an embodiment.

FIG. 5 shows a graph 500 illustrating relationships between correlation parameters and flow rate correction values used to correct for viscosity effects according to an embodiment. The graph 500 includes a correlation parameter axis 510 and a mass error axis 520. The correlation parameter axis 510 is a non-viscosity correlation parameter, which is the vibrating frequency ratio described above with reference to FIG. 4. As shown in FIG. 5, the correlation parameter axis 510 ranges from 1.185 to about 1.235. The mass error axis 520 is a mass flow rate error, in percentage, and ranges from −0.70 to 0.20. The graph 500 shows a plurality of data points 530 for different fluids that relate the mass error to a viscosity value. The data points 530 for each of the different fluids are indicated by the differently shaped markers (e.g., triangle, square, cross, double-cross, etc.).

The mass flow rate error percentage ranges from about −0.20 to about 0.05 for the vibrating frequency ratio of about 1.185 to about 1.195. In the vibrating frequency range of about 1.195 to about 1.20, mass flow rate error percentage drops to range of about −0.35 to −0.60. As can be appreciated, the change in mass flow rate error has a parabolic shape with a peak at a vibrating frequency ratio of about 1.190. Accordingly, a curve may be fitted to the data from 1.185 to about 1.205. Further to the right of the figure, at a vibrating frequency ratio of about 1.230, the mass flow rate error percentage reading ranges from about 0.05 to about −0.40. This set of mass flow rate error percentage readings may be approximated with a single mass flow rate error value, such as an average of the mass flow rate error percentage values, which may be about −0.20.

The viscosity of the fluid can be measured, input, or otherwise provided so as to be correlated with the non-viscosity correlation parameter. For example, a viscosity of a fluid may be input into the meter electronics 20 prior to the fluid flow rate being measured. The meter electronics 20 can subsequently correlate the input viscosity with the measured flow rate of the fluid. Alternatively, a system that includes a viscometer in communication with, directly or indirectly, the meter electronics 20 can be employed to measure the viscosity of the fluid in a vibratory meter, such as the vibratory meter 5 shown in FIG. 1. Exemplary systems are described below with reference to FIGS. 6 and 7.

Figure 6:
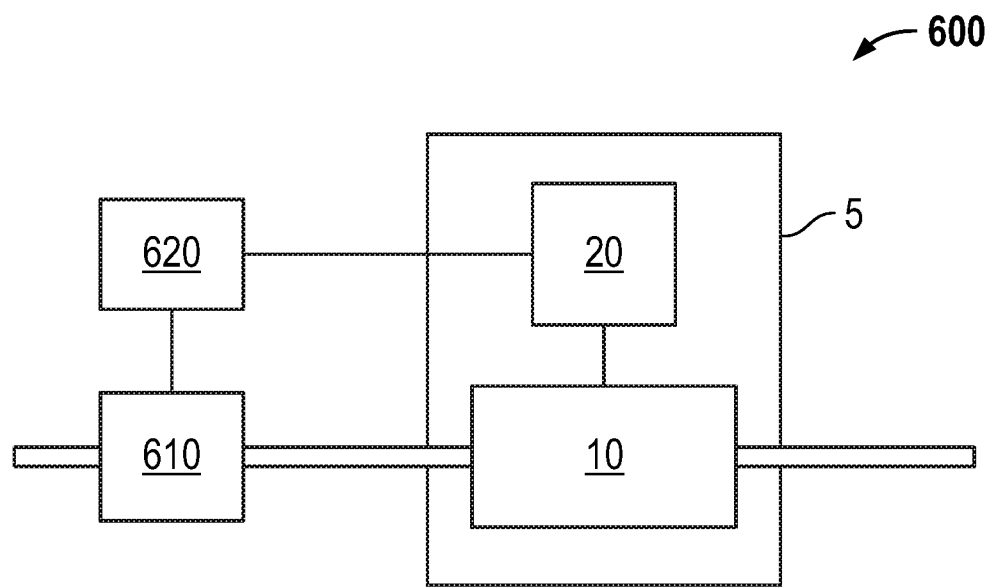
FIG. 6 shows a system 600 for correcting a measured flow rate for viscosity effects according to an embodiment.

FIG. 6 shows a system 600 for correcting a measured flow rate for viscosity effects according to an embodiment. As shown in FIG. 6, the system 600 includes the vibratory meter 5 with the sensor assembly 10 and the meter electronics 20 described in the foregoing with reference to FIG. 1. The system 600 also includes a viscometer 610 that is coupled to an inlet of the sensor assembly 10 and a controller 620 that is communicatively coupled to the viscometer 610 and the vibratory meter 5. In particular, the controller 620 is communicatively coupled to the meter electronics 20.

The vibratory meter 5 is configured to determine a flow rate of a fluid in the vibratory meter 5. In particular, the meter electronics 20 is configured to receive sensor signals from the sensor assembly 10 and determine the flow rate of the fluid. The meter electronics 20 is also configured to determine a non-viscosity correlation parameter of the fluid based on the sensor signals. For example, the meter electronics 20 may be configured to determine a fluid velocity-to-mass flow rate ratio based on the sensor signals. The meter electronics 20 may also be configured to determine a vibrating frequency ratio.

The viscometer 610 can measure a viscosity of the fluid being provided to the vibratory meter 5 and provide the measured viscosity to the controller 620. The controller 620 can receive the measured viscosity and provide the measured viscosity to the vibratory meter 5 and, more particularly, to the meter electronics 20. Alternatively, the vibratory meter 5 and, more particularly, the meter electronics 20 can provide the measured flow rate and the determined non-viscosity correlation parameter to the controller 620. Alternatively, a viscometer may be in communication with the vibratory meter 5, as will be discussed in the following with reference to FIG. 7.

Figure 7:
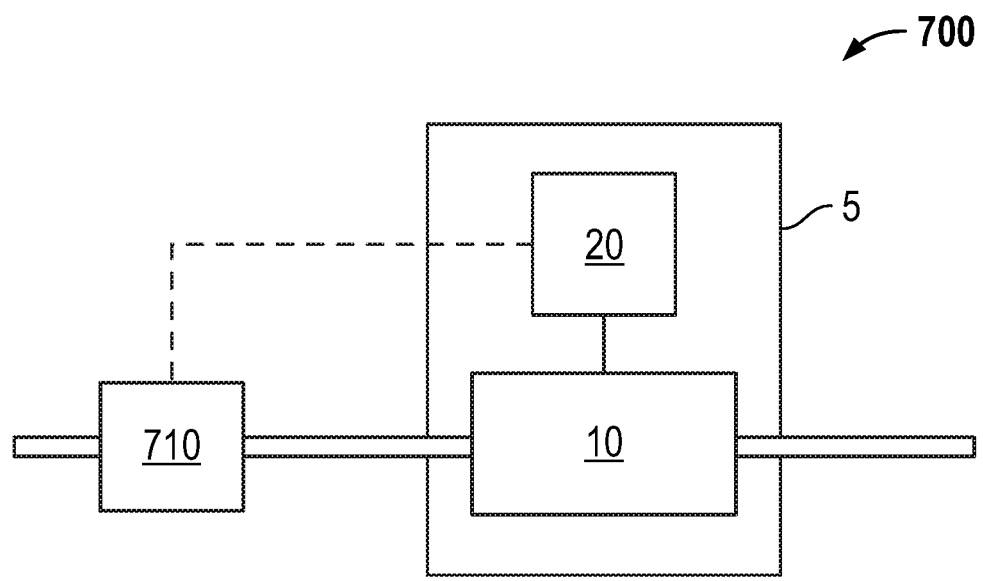
FIG. 7 shows a system 700 for correcting a measured flow rate for viscosity effects according to an embodiment.

FIG. 7 shows a system 700 for correcting a measured flow rate for viscosity effects according to an embodiment. As shown in FIG. 7, the system 700 includes the vibratory meter 5 with the sensor assembly 10 and the meter electronics 20 described in the foregoing with reference to FIG. 1. The system 700 also includes a viscometer 710 that may be the same as or different than the viscometer 610 that is part of the system 600 shown in FIG. 6. As shown in FIG. 7, the viscometer 710 is in direct communication with the vibratory meter 5 rather than a controller. Accordingly, the viscometer 710 can measure a viscosity of the fluid that is being provided to the vibratory meter 5 and provide the measured viscosity to the vibratory meter 5.

As is indicated by the dashed line connecting the viscometer 710 to the meter electronics 20, the viscometer 710 may not necessarily be connected with the meter electronics 20 to provide the viscosity of the fluid. For example, the viscometer 710 can measure the fluid at some other time to measure the viscosity of the fluid. The measured viscosity may be entered into the meter electronics 20 at a later time. The vibratory meter 5 may also be configured to correlate the measured viscosity with the measured flow rate.

With reference to the systems 600 and 700, an actual mass flow rate may also be determined using a method or apparatus that is capable of measuring an actual mass flow rate regardless of viscosity. For example, a total volume flow of the fluid through the vibratory meter 5 may be measured by the viscometer 610, 710 using volume measuring functions. Although the actual mass flow rate can be measured by the viscometer 610, 710, alternative systems can include a separate method/apparatus to determine the actual mass flow rate. The actual mass flow rate can be used to determine a flow rate correction value for the viscosity of the fluid. For example, the measured fluid flow rate provided by the vibratory meter 5 may be compared to the actual mass flow rate to determine a mass flow rate error percentage. This mass flow rate error percentage can be correlated with the measured viscosity provided by the viscometer 610, 710 and stored in the meter electronics 20.

Accordingly, the meter electronics 20 can have a stored viscosity value that is correlated with a non-viscosity correlation parameter and a flow rate correction value. For example, the viscosity value may be correlated with a fluid velocity-to-mass flow rate ratio value and/or a vibrating frequency ratio value and a mass flow rate error percentage value. These correlations can be employed to correct a measured flow rate value, such as a flow rate value measured during operation as the following discussion with reference to FIG. 8 illustrates.

Figure 8:
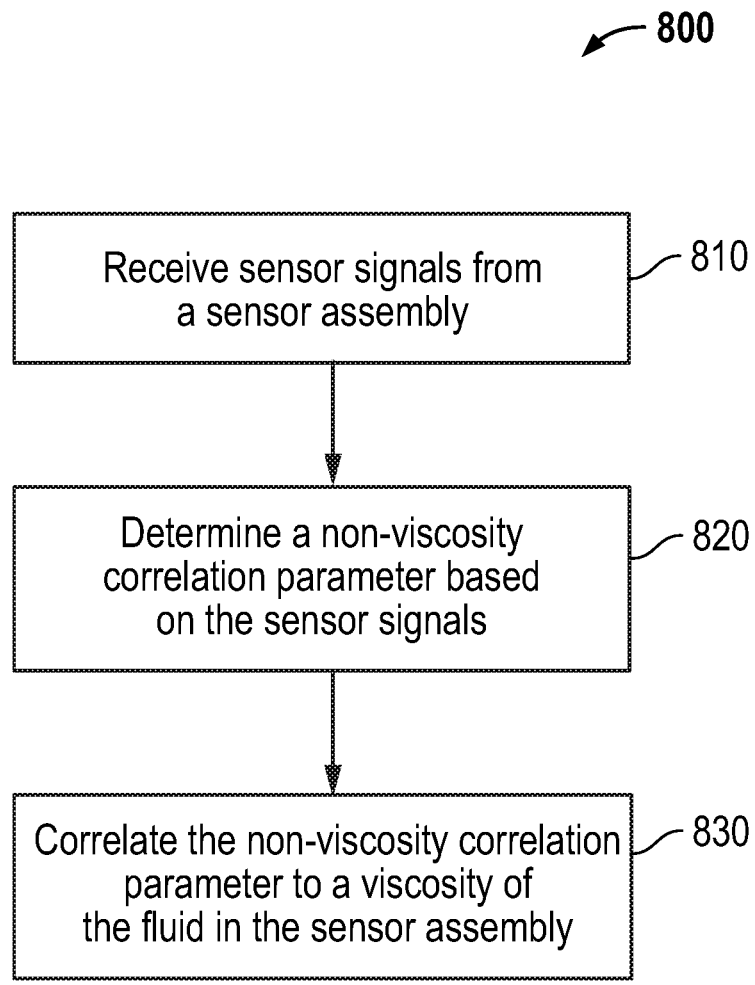
FIG. 8 shows a method 800 of correcting a measured flow rate for viscosity effects according to an embodiment.

FIG. 8 shows a method 800 of correcting a measured flow rate for viscosity effects according to an embodiment. As shown in FIG. 8, the method 800 begins by receiving sensor signals from a sensor assembly in step 810. In step 820, the non-viscosity correlation parameter of the fluid is determined based on the sensor signals. The non-viscosity correlation parameter and a viscosity of the fluid are correlated in step 830.

The non-viscosity correlation parameter may be, for example, a vibrating frequency ratio of a sensor assembly 10 in the vibratory meter 5. Other non-viscosity correlation parameters based on the sensor signals may be determined, such as fluid velocity-to-mass flow rate ratio. In the case of the fluid velocity-to-mass flow rate ratio, the parameters of the sensor assembly 10 may be relied on along with the sensor signals to determine the non-viscosity correlation parameter. For example, the fluid velocity may be determined based on the effective cross-sectional area of the conduits 130, 130' in the sensor assembly 10.

The viscosity and non-viscosity correlation parameter of the fluid in the vibratory meter may be measured and correlated during manufacturing, on-site calibration, or the like. With reference to the systems 600, 700 shown in FIGS. 6 and 7, the viscosity may be measured by a viscometer 610, 710 communicatively coupled to the vibratory meter 5. Alternatively the viscosity of the fluids may be measured separately (e.g., predetermined, or the like) and then manually entered into the vibratory meter 5, provided via the path 26, etc.

As a result, during operation, the meter electronics 20 can use the sensor signals 165*l*, 165*r* to determine, for example, a frequency of the sensor assembly 10 and use this frequency to determine a ratio of the determined frequency to a frequency of the sensor assembly 10 when the sensor assembly is measuring a reference or characterized fluid with a known viscosity value, such as water, air, or the like. This vibrating frequency ratio may be stored in the meter electronics 20 along with a flow rate correction value. Both the vibrating frequency ratio and the flow rate correction value can be correlated with the viscosity of the fluid. These and other correlations can be used to correct a measured flow rate.

Figure 9:
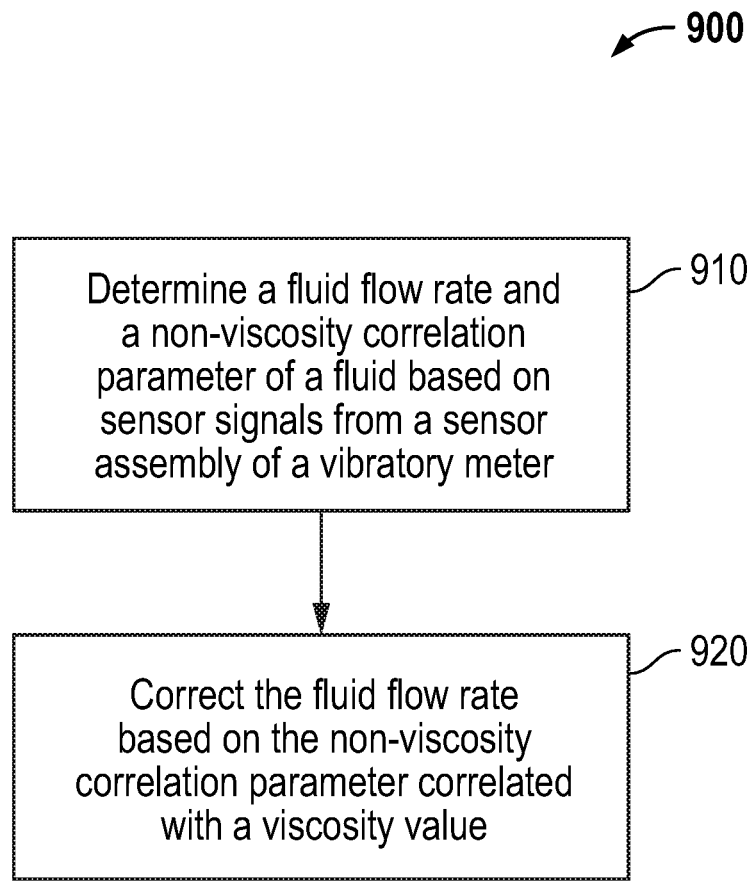
FIG. 9 shows a method 900 for correcting a measured flow rate for viscosity effects according to an embodiment.

FIG. 9 shows a method 900 for correcting a measured flow rate for viscosity effects according to an embodiment. As shown in FIG. 9, the method 900 determines a fluid flow rate and a non-viscosity correlation parameter of a fluid based on sensor signals from a sensor assembly of a vibratory meter. In step 920, the method 900 corrects the fluid flow rate based on the non-viscosity correlation parameter correlated with a viscosity value. Accordingly, the measured flow rate can be corrected for viscosity effects without knowing or measuring the viscosity of the measured fluid.

In step 910, the method 900 can determine the fluid flow rate and the non-viscosity correlation parameter of the fluid based on sensor signals provided by, for example, the sensor assembly 10 in the vibratory meter 5. In this exemplary embodiment, the meter electronics 20 can receive the sensor signals provided by the sensor assembly 10 and determine the fluid flow rate and the non-viscosity correlation parameter. The non-viscosity correlation parameter may be, for example, a fluid velocity-to-mass flow rate ratio or a vibrating frequency ratio of the vibratory meter 5.

In step 920, the method 900 can correct the fluid flow rate based on the non-viscosity correlation parameter correlated with the viscosity value, for example, using a flow rate correction value that is correlated with the viscosity value. For example, the method 900 may use the determined non-viscosity correlation parameter that is correlated with a viscosity value to obtain the flow rate correction value also correlated to the same viscosity. The flow rate correction value can be a flow rate percentage, such as a mass flow rate percentage, but may be any suitable value that is correlated with the viscosity and can be used to correct the measured flow rate for viscosity effects.

The viscosity value may or may not be a viscosity value of the fluid being measured in step 910. For example, the viscosity value may be a viscosity value of one or more other fluids or fluids that are not being measured by the sensor assembly 10 in the vibratory meter 5. More specifically, referring to the method 800 described above, the viscosity value of method 900 may be based on fluids measured during calibration that are not the same as the fluid being measured in step 910. Accordingly, the non-viscosity correlation parameter may be used to correct the mass flow rate for viscosity effects of the fluid being measured even though a viscosity value of the fluid being measured is not known.

The embodiments described above provide a vibratory meter 5, systems 600, 700 and methods 800, 900 for correcting for viscosity effects. The embodiments provide and improve the technical process of measuring flow rates by taking into account viscosity effects of a fluid without necessarily knowing or measuring the viscosity of the fluid. For example, by measuring and correlating the viscosity of various fluids with the non-viscosity correlation parameter, a relationship, such as an equation, between various viscosity values and the non-viscosity correlation may be established. This and other relationships can be used to correct the measured flow rate for viscosity effects.

The correction of the measured flow rate may be performed using a flow rate correction value that has been correlated with viscosity using the various fluids. For example, a mass flow rate error percentage that is correlated with a viscosity value or the non-viscosity correlation parameter may be employed. Because the non-viscosity correlation parameter is based on the sensor signals from the vibratory meter and is correlated with the viscosity of various fluids, additional equipment is not needed, such as a viscometer, or the like, that measures the viscosity of the fluid to correct a flow rate measurement. The non-viscosity correlation parameter may be determined and correlated with a viscosity value based on two or more fluids that are characterized using a viscometer, or viscosity values that are otherwise known. The viscosity of the fluids may also be correlated with the flow rate correction value.

Accordingly, the technology of flow rate measurements is improved by accounting for viscosity effects of the fluid being measured by the vibratory meter. A specific improvement may be the improved accuracy of the flow rate by correcting a measured flow rate using the flow rate correction value. The specific improvement can also be a consistent accuracy in flow rate measurements over various fluids with a wide variety of viscosity values. In addition, because various fluids have been characterized to provide a relationship, such as an equation or data relationship, between the non-viscosity correlation parameter and a flow rate correction value, the operation of the meter electronics is improved by avoiding signal processing associated with real time signals from other equipment such as a viscometer. The operation of the vibratory meter is also improved by ensuring that the viscosity of the fluid being measured is inherently associated with the flow rate measurement. That is, delay issues associated with two different sensors along a conduit carrying a fluid is avoided.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other system and methods that correct a measured for rate for viscosity effects and not just to the embodiments described above and shown in the accompanying figures. Accordingly, the scope of the embodiments described above should be determined from the following claims.

I claim:

1. A system (600, 700) for correcting a measured flow rate for viscosity effects of a fluid in a vibratory meter (5), the system comprising:
   a sensor assembly (10); and
   a meter electronics (20) communicatively coupled to the sensor assembly (10), the meter electronics (20) being configured to:
      receive sensor signals from the sensor assembly (10);
      determine a correlation parameter based on the sensor signals, the correlation parameter not being comprised of viscosity related parameters; and
      correlate the correlation parameter to a viscosity of a fluid in the sensor assembly (10) for correcting a fluid flow rate measurement of the fluid;
   wherein the correlation parameter comprises one of a fluid velocity-to-mass flow rate ratio and a vibrating frequency ratio of the vibratory meter (5).

2. The system (600, 700) of claim 1, wherein the meter electronics (20) is further configured to correlate the correlation parameter with a viscosity of two or more fluids.

3. The system (600, 700) of claim 1, wherein the meter electronics (20) is further configured to correlate the correlation parameter to an error percentage of a fluid flow rate of the fluid in the sensor assembly (10).

4. The system (600, 700) of claim 1, further comprising a viscometer (610, 710) communicatively coupled to the meter electronics (20), said viscometer (610, 710) being configured to measure the viscosity of the fluid and provide the measured viscosity to the meter electronics (20).

5. The system (600, 700) of claim 1, wherein the meter electronics (20) is further configured to determine a fluid flow rate based on the sensor signals.

6. A method for correcting a measured flow rate for viscosity effects of a fluid in a vibratory meter, the method comprising:
   receiving sensor signals from a sensor assembly;
   determining a correlation parameter based on the sensor signals, the correlation parameter not being comprised of viscosity related parameters; and
   correlating the correlation parameter to a viscosity of a fluid in the sensor assembly for correcting a fluid flow rate measurement of the fluid;
   wherein the correlation parameter comprises one of a fluid velocity-to-mass flow rate ratio and a vibrating frequency ratio of the vibratory meter.

7. The method of claim 6, further comprising correlating the correlation parameter to a viscosity of two or more fluids.

8. The method of claim 6, further comprising correlating the correlation parameter to an error percentage of the measured flow rate and correlating the error percentage to a viscosity of the fluid in the sensor assembly.

9. A vibratory meter (5) for correcting a measured flow rate for viscosity effects of a fluid, the vibratory meter (5) comprising:
   a sensor assembly (10); and
   a meter electronics (20) communicatively coupled to the sensor assembly (10), the meter electronics (20) being configured to:
      determine a fluid flow rate and a correlation parameter of the fluid based on sensor signals from a sensor assembly of a vibratory meter, the correlation parameter not being comprised of viscosity related parameters; and
      correct the fluid flow rate based on the correlation parameter, said correlation parameter being correlated with a viscosity value;
   wherein the correlation parameter comprises one of a fluid velocity-to-mass flow rate ratio and a vibrating frequency ratio of the vibratory meter.

10. The vibratory meter (5) of claim 9, wherein the correlation parameter is correlated with a viscosity value of two or more fluids.

11. The vibratory meter (5) of claim 9, wherein the correlation parameter being correlated with the viscosity value comprises the correlation-parameter being correlated with a viscosity value of one or more other fluids.

12. The vibratory meter (5) of claim 9, wherein the meter electronics (20) being configured to correct the fluid flow rate based on the correlation parameter comprises the meter electronics (20) being configured to obtain an error percentage of a flow rate correlated with the correlation parameter and correcting the fluid flow rate using the error percentage.

13. A method of correcting a measured flow rate for viscosity effects of a fluid in a vibratory meter, the method comprising:
   determining a fluid flow rate and a correlation parameter of the fluid based on sensor signals from a sensor assembly of a vibratory meter, the correlation parameter not being comprised of viscosity related parameters; and
   correcting the fluid flow rate based on the correlation parameter, said correlation parameter being correlated with a viscosity value;
   wherein the correlation parameter comprises one of a fluid velocity-to-mass flow rate ratio and a vibrating frequency ratio of the vibratory meter.

14. The method of claim 13, wherein the correlation parameter is correlated with a viscosity value of two or more fluids.

15. The method of claim 13, wherein the correlation parameter being correlated with the viscosity value comprises the correlation parameter being correlated with a viscosity value of one or more other fluids.

16. The method of claim 13, wherein correcting the fluid flow rate based on the correlation parameter comprises obtaining an error percentage of a flow rate correlated with the correlation parameter and correcting the fluid flow rate using the error percentage.

* * * * *

UNITED STATES PATENT AND TRADEMARK OFFICE
CERTIFICATE OF CORRECTION

| | |
|---|---|
| PATENT NO. | : 11,499,857 B2 |
| APPLICATION NO. | : 16/610167 |
| DATED | : November 15, 2022 |
| INVENTOR(S) | : Dean M. Standiford |

It is certified that error appears in the above-identified patent and that said Letters Patent is hereby corrected as shown below:

In the Specification

Column 6, Line 21, replace "signals 1651l, 165r," with --signals 165l, 165r,--

Signed and Sealed this
Fifteenth Day of October, 2024

Katherine Kelly Vidal
*Director of the United States Patent and Trademark Office*